(12) United States Patent
Yamashita et al.

(10) Patent No.: US 11,169,321 B2
(45) Date of Patent: Nov. 9, 2021

(54) LIQUID CRYSTAL DISPLAY DEVICE

(71) Applicant: Panasonic Intellectual Property Management Co., Ltd., Osaka (JP)

(72) Inventors: Shuji Yamashita, Nara (JP); Hisanori Sasaki, Osaka (JP); Satoru Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/103,747

(22) Filed: Nov. 24, 2020

(65) Prior Publication Data
US 2021/0080643 A1 Mar. 18, 2021

Related U.S. Application Data

(63) Continuation of application No. PCT/JP2019/012250, filed on Mar. 22, 2019.

(30) Foreign Application Priority Data

May 25, 2018 (JP) .............................. JP2018-100794

(51) Int. Cl.
*G02F 1/1335* (2006.01)
*F21V 8/00* (2006.01)

(52) U.S. Cl.
CPC ......... *G02B 6/0091* (2013.01); *G02B 6/0088* (2013.01); *G02F 1/133553* (2013.01); *G02F 2202/28* (2013.01)

(58) Field of Classification Search
CPC .................................................. G02B 6/0091
See application file for complete search history.

(56) References Cited

U.S. PATENT DOCUMENTS

2003/0030765 A1 2/2003 Hayashi et al.
2008/0303979 A1* 12/2008 Shimizu ............ G02F 1/133615
349/65
(Continued)

FOREIGN PATENT DOCUMENTS

EP 1306714 A1 5/2003
JP 2002-122861 A 4/2002
(Continued)

OTHER PUBLICATIONS

International Search Report issued in corresponding International Patent Application No. PCT/JP2019/012250, dated Jun. 4, 2019, with English translation.

*Primary Examiner* — Sang V Nguyen
(74) *Attorney, Agent, or Firm* — McDermott Will & Emery LLP

(57) ABSTRACT

A liquid crystal display device includes a liquid crystal panel having a reflection layer on a back surface opposite to a display surface of the liquid crystal panel, a light-guiding plate being closely fixed to the display surface and configured to diffusely reflect light incident and emit the light toward the display surface, a light source holding plate having a light source fixing plate on which a light source is mounted, and a back-side frame that includes a back-side portion disposed in parallel with the back surface of the liquid crystal panel and supported by the light source holding plate. A pair of positioning bent portions that are bent perpendicularly from the back-side portion and support the one end surface are formed on both sides at a lower end edge of the back-side portion along the one end surface.

3 Claims, 13 Drawing Sheets

(56) References Cited

U.S. PATENT DOCUMENTS

| | | | |
|---|---|---|---|
| 2014/0267971 A1 | 9/2014 | Sugimoto et al. | |
| 2016/0363811 A1* | 12/2016 | Zhong | G02F 1/133528 |
| 2018/0120643 A1* | 5/2018 | Watanabe | G02F 1/0316 |
| 2018/0149800 A1* | 5/2018 | Kim | G02B 6/0055 |
| 2018/0173052 A1* | 6/2018 | Shinohara | G02F 1/133615 |
| 2019/0033656 A1* | 1/2019 | Tan | G09G 3/3696 |

FOREIGN PATENT DOCUMENTS

| | | | |
|---|---|---|---|
| JP | 2002-162912 A | 6/2002 | |
| JP | 2002-258281 A | 9/2002 | |
| JP | 2003-114417 A | 4/2003 | |
| JP | 2008-305576 A | 12/2008 | |
| JP | 2014-048322 A | 3/2014 | |
| JP | 2014-174540 A | 9/2014 | |
| WO | 02/001854 A2 | 1/2002 | |
| WO | 02/010854 A1 | 2/2002 | |
| WO | WO 02010854 * | 2/2002 | G02F 1/1335 |

\* cited by examiner

LIQUID CRYSTAL DISPLAY DEVICE

CROSS-REFERENCE OF RELATED APPLICATIONS

This application is a U.S. Continuation of International Patent Application No. PCT/JP2019/012250, filed on Mar. 22, 2019, which in turn claims the benefit of Japanese Application No. 2018-100794, filed on May 25, 2018, the entire disclosures of which Applications are incorporated by reference herein.

BACKGROUND OF THE INVENTION

1. Field of the Invention

The present disclosure relates to a liquid crystal display device.

2. Description of the Related Art

JP-A-2003-114417 discloses a liquid crystal display device including a liquid crystal panel having a surface of a planar shape, a plate-shaped front light, and a frame-shaped protector that is provided at a peripheral edge portion of the front light and mounts the front light on the surface of the liquid crystal panel. The protector includes a rear case that supports the front light from a back surface of the front light, a front case that is provided on a surface side of the liquid crystal panel and is combined with the rear case, and a protective film that covers the peripheral edge portion of the front light from a surface side of the front light and is adhered onto the rear case.

SUMMARY OF THE INVENTION

The present disclosure has been devised in view of the above-described related-art circumstances, and an object thereof is to provide a liquid crystal display device that achieves edge narrowing of the liquid crystal display device with a simple structure and prevents occurrence of positional deviation between a light source and a light-guiding plate.

The present disclosure provides a liquid crystal display device including: a quadrangular liquid crystal panel having a reflection layer on a back surface opposite to a display surface of the liquid crystal panel; a light-guiding plate that is formed in a quadrangular shape having an outer shape larger than that of the liquid crystal panel, being closely fixed via an adhesive layer to the display surface, and configured to diffusely reflect light incident from one end surface of the light-guiding plate and emit the light toward the display surface, the light-guiding plate being made of glass; a light source holding plate in which a light source that causes light to be incident on the one end surface is mounted on a light source fixing plate disposed to face said one end surface; and a back-side frame that includes a back-side portion formed in a quadrangular shape substantially the same as that of the light-guiding plate, disposed in parallel with the back surface of the liquid crystal panel, and supported by the light source holding plate, and in which a pair of positioning bent portions that are bent perpendicularly from the back-side portion and support the one end surface are formed on both sides that sandwich the light source therebetween at a lower end edge of the back-side portion along the one end surface.

According to the present disclosure, edge narrowing of the liquid crystal display device can be achieved with a simple structure, and occurrence of positional deviation between a light source and a light-guiding plate can be prevented.

DETAILED DESCRIPTION OF THE EXEMPLARY EMBODIMENTS

Background to Contents of First Embodiment

In the related art, a reflective liquid crystal display device is known in which a front light is provided as an auxiliary light source on a surface side of a reflective liquid crystal panel. In a liquid crystal display device of JP-A-2003-114417, since many frame-shaped members such as a front case, a rear case, and a cell case are used in order to laminate the front light and the liquid crystal panel, a structure of the liquid crystal display device is complicated. Further, since a frame-shaped protector is further housed in the frame-shaped cell case, a width of a frame that surrounds a periphery of the liquid crystal panel tends to increase. On the other hand, since the front light is a thin surface member, when a fixing strength is reduced by using the frame-shaped members having narrow edges, there is a concern that positional deviation with a light source may occur due to thermal expansion. When the positional deviation occurs, color unevenness occurs in an image. The positional deviation is noticeable when a light-guiding plate made of resin is used.

Hereinafter, an example of a liquid crystal display device that achieves edge narrowing of the liquid crystal display device with simple components and prevents occurrence of positional deviation between the light source and a light-guiding plate for the front light will be described.

Hereinafter, an embodiment specifically disclosing a liquid crystal display device according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It is to be understood that the accompanying drawings and the following description are provided to enable those skilled in the art to fully understand the present disclosure, and are not intended to limit the range of the claims.

Figure 1:
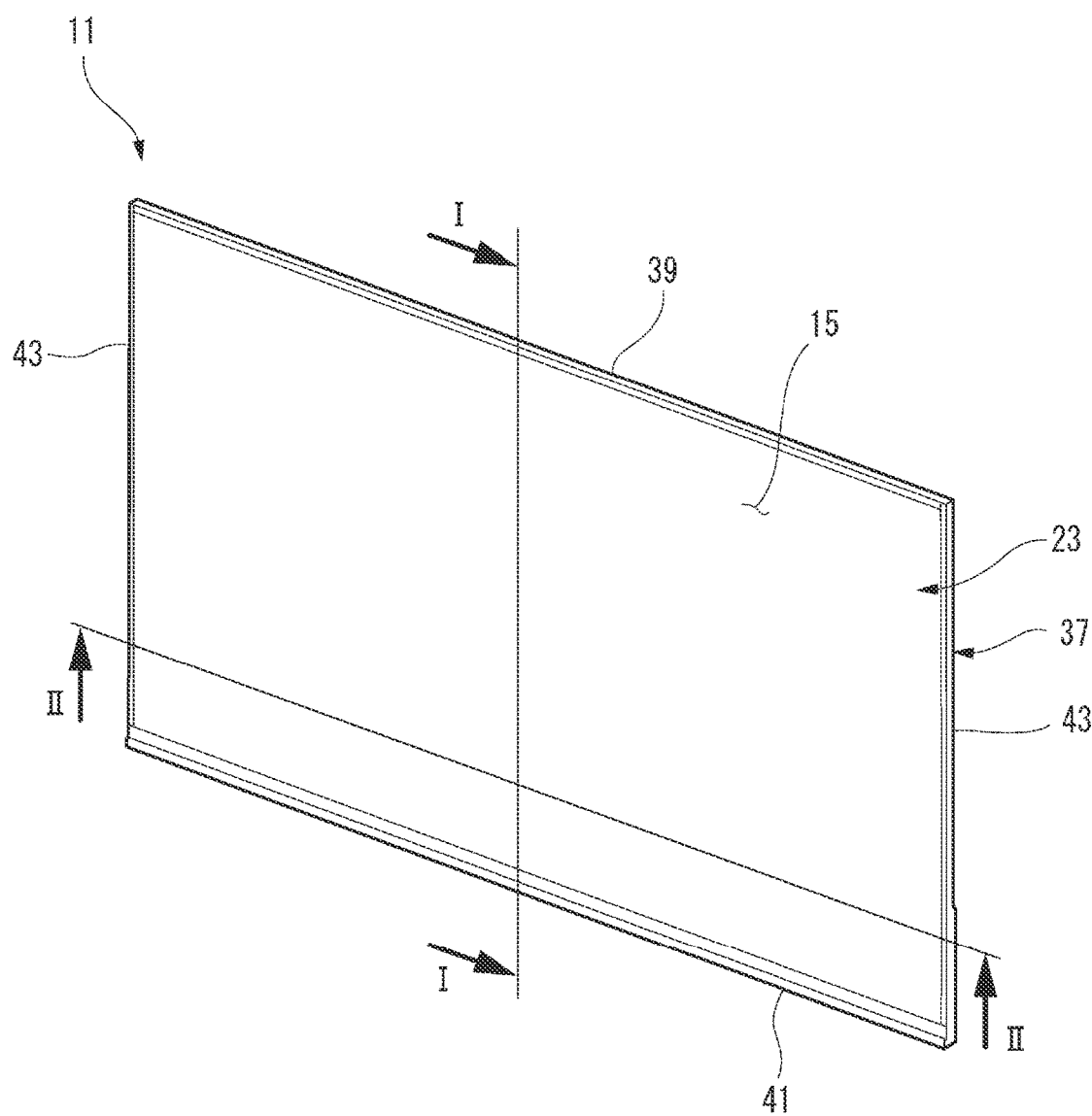
FIG. 1 is an external perspective view of a liquid crystal display device according to a first embodiment.

FIG. 1 is an external perspective view of a liquid crystal display device 11 according to a first embodiment. The liquid crystal display device 11 according to the first embodiment includes a liquid crystal panel 13, a light-guiding plate 15, an LED holding plate 17 that is an example of a light source holding plate, and a back-side frame 19 as a main configuration. The LED holding plate 17 and the back-side frame 19 constitute a frame 21.

In the liquid crystal display device 11, a front light 23 serving as an auxiliary light source is provided on a surface side of the reflective liquid crystal panel 13. The front light 23 is configured with the light-guiding plate 15 and LEDs 25 that are examples of a light source. The liquid crystal panel 13 does not emit light by itself, changes transmission intensity of light so as to perform display, and can be driven with an effective voltage of, for example, several volts. A reflection layer 27 is provided on a back side of the reflective liquid crystal panel 13 opposite to a direction toward the light-guiding plate 15, and the reflective liquid crystal panel 13 performs display by using reflected light from the reflection layer 27 of external light. Therefore, power consumption is extremely low. In the liquid crystal display device 11, the reflective liquid crystal panel 13 includes the front light 23. Accordingly, high visibility under sunlight and visibility at night are made possible. Then, as compared with a transmissive liquid crystal panel 13 including a backlight that is used in a related-art mobile phone or the like, since a cooling fan can also be eliminated, power consumption can be significantly reduced. In the first embodiment, the light source is not limited to the LEDs 25 and may be, for example, a cold-cathode fluorescent tube referred to as a cold cathode fluorescence lamp (CCFL).

Figure 2:
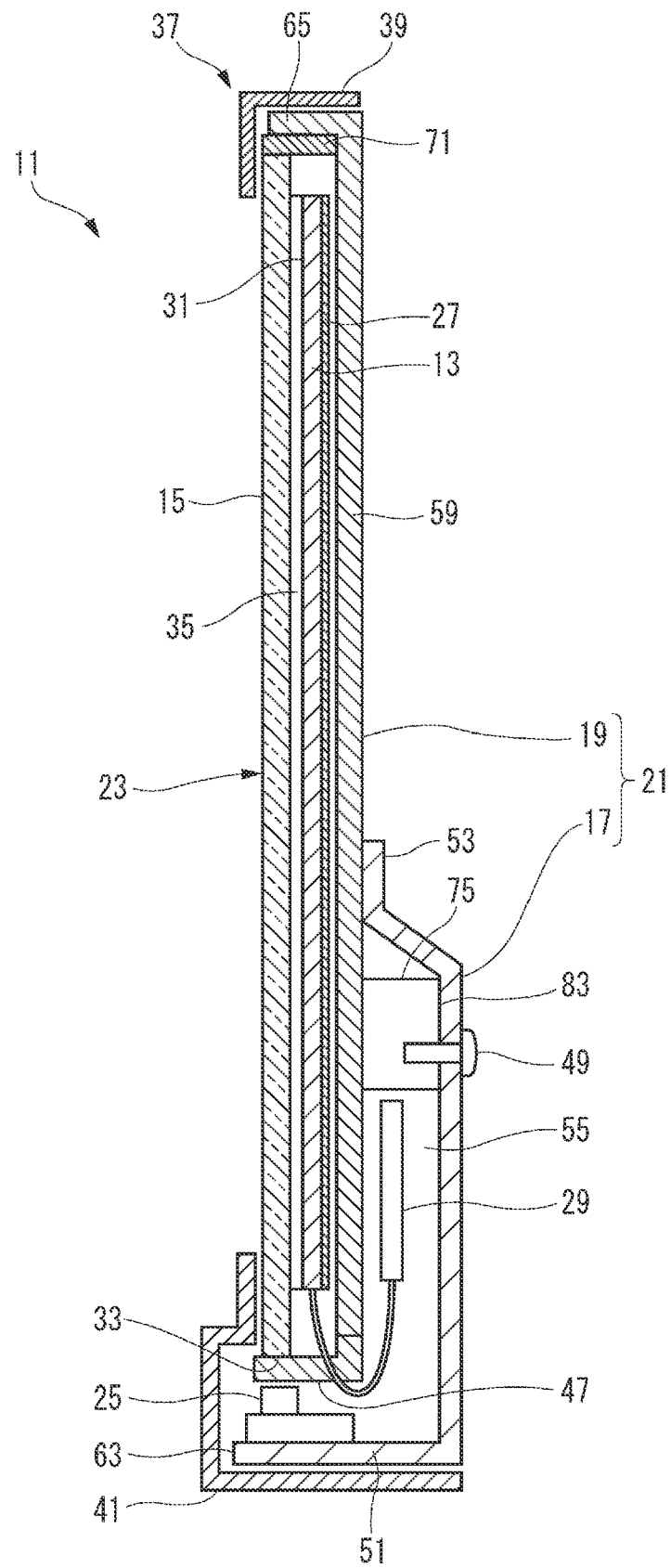
FIG. 2 is a cross-sectional view taken along a line I-I in FIG. 1.

FIG. 2 is a cross-sectional view taken along a line in FIG. 1. The liquid crystal panel 13 is configured by sandwiching a liquid crystal between a quadrangular upper glass on which a segment electrode group is formed and a quadrangular lower glass on which a common electrode group is formed. The liquid crystal is enclosed in a gap between the upper glass and the lower glass, and an outer periphery thereof is sealed. One end of, for example, an FFC (flexible flat cable) or an FPC (flexible printed wiring board) is connected to the segment electrode group and the common electrode group. In the FPC, a conductor is pattern-printed on an insulation substrate having flexibility. The other end of the FFC or the like is connected, via the relay substrate 29, to a driver or the like that drives the liquid crystal.

In the first embodiment, the liquid crystal panel 13 is formed to have a size of, for example, 32 inches. The size of the liquid crystal panel 13 is not limited thereto.

The relay substrate 29 supplies an electrical signal and electrical energy that drive the liquid crystal panel 13. The liquid crystal panel 13 displays a desired image on a display surface 31 by the electrical signal and the electrical energy supplied from the relay substrate 29.

The liquid crystal display device 11 includes the reflection layer 27 on a back surface opposite to the display surface 31 of the liquid crystal display device 11. The reflection layer 27 may be provided as a reflection plate on the lower glass or may be attached as a reflection sheet to the lower glass. The reflection layer 27 reflects external light transmitted through the light-guiding plate 15 and the liquid crystal panel 13 toward the liquid crystal panel 13. Further, the reflection layer 27 reflects light emitted from the light-guiding plate 15 and transmitted through the liquid crystal panel 13 toward the liquid crystal panel 13.

The light-guiding plate 15 is formed in a quadrangular shape substantially the same as that of the liquid crystal panel 13. Shapes of the liquid crystal panel 13 and the light-guiding plate 15 may not be formed in a quadrangular shape as long as a condition is satisfied under which the liquid crystal panel 13 and the light-guiding plate 15 are positioned by the light-guiding plate 15 and the back-side frame 19 in the vicinity of end portion sides of one side along one end surface 33. In the first embodiment, the light-guiding plate 15 is formed of a transparent plate material made of glass. The light-guiding plate 15 is not limited to being made of glass and may be made of, for example, acrylic resin.

The light-guiding plate 15 is laminated on the display surface 31 of the liquid crystal panel 13. The light-guiding plate 15 diffusely reflects light incident from one end surface 33 and emits the light toward the display surface 31 of the liquid crystal panel 13. The light-guiding plate 15 is subjected to prism processing, for example, on a surface side, and an anti-reflection material is applied to a back surface side of the light-guiding plate 15. The light incident from one end surface 33 of the light-guiding plate 15 propagates through the light-guiding plate 15 as a medium, and a part of the light is reflected by a prism-processed portion on the surface side and is emitted as diffused light toward the liquid crystal panel 13. Accordingly, the light-guiding plate 15 has a function of reflecting light from the LEDs 25 and causing the light to be incident on the liquid crystal panel 13, a function of transmitting light reflected by the reflection layer 27 to outside, and a function of transmitting light from the outside to the liquid crystal panel 13.

The light-guiding plate 15 is adhered to the display surface 31 of the liquid crystal panel 13 by an adhesive layer 35 to be described later. A peripheral edge of the light-guiding plate 15 integrated with the liquid crystal panel 13 is held on the frame 21 by a frame member 37 (so-called bezel). The frame member 37 is fixed (for example, screwed) to the frame 21 by a screw (not shown) that is a fastener. A bezel upper side 39 is screwed to the back-side frame 19 that constitutes the frame 21. A bezel lower side 41 is screwed to the LED holding plate 17 that constitutes the frame 21.

Figure 3:
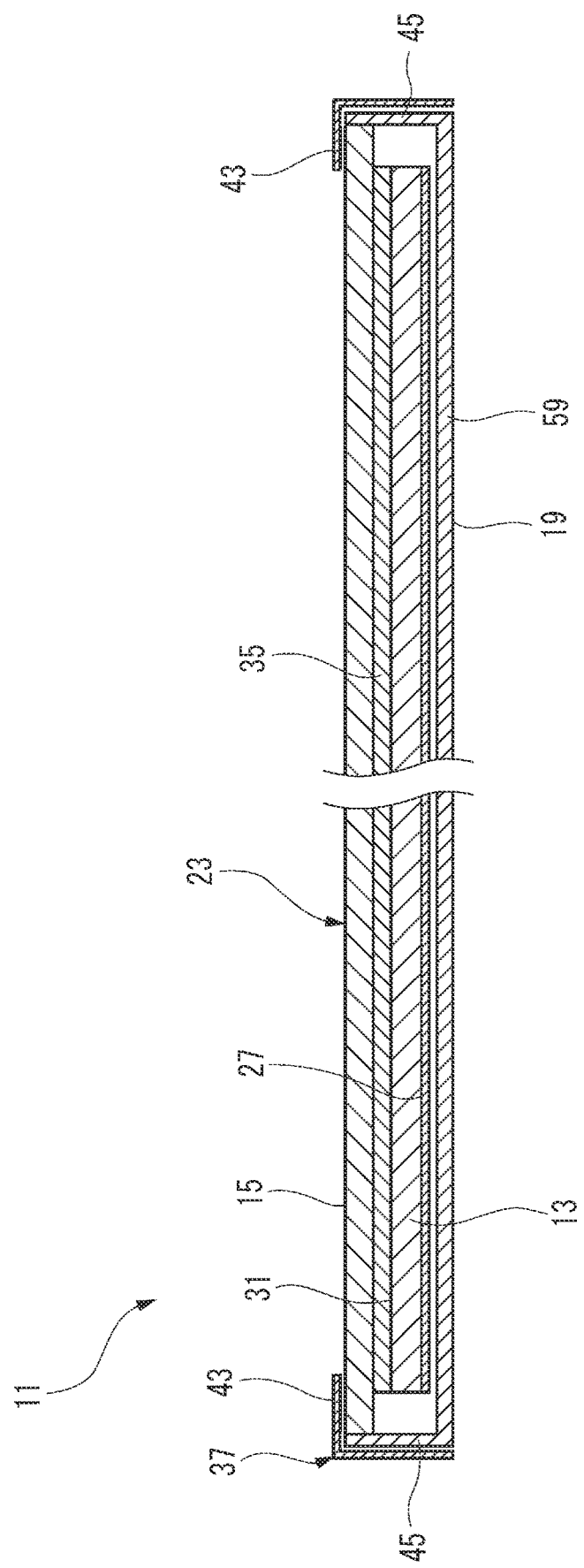
FIG. 3 is a cross-sectional view taken along a line 1141 in FIG. 1.

FIG. 3 is a cross-sectional view taken along a line in FIG. 1. Bezel lateral sides 43 are screwed to bent side plate portions 45 of the back-side frame 19.

The light-guiding plate 15 is formed in a simple quadrangular shape in which a convex portion or a concave portion is not formed in each side portion and four sides are straight lines. In the light-guiding plate 15, one end surface 33 of one side among these four sides is supported by positioning bent portions 47 (see FIG. 2).

Figure 4:
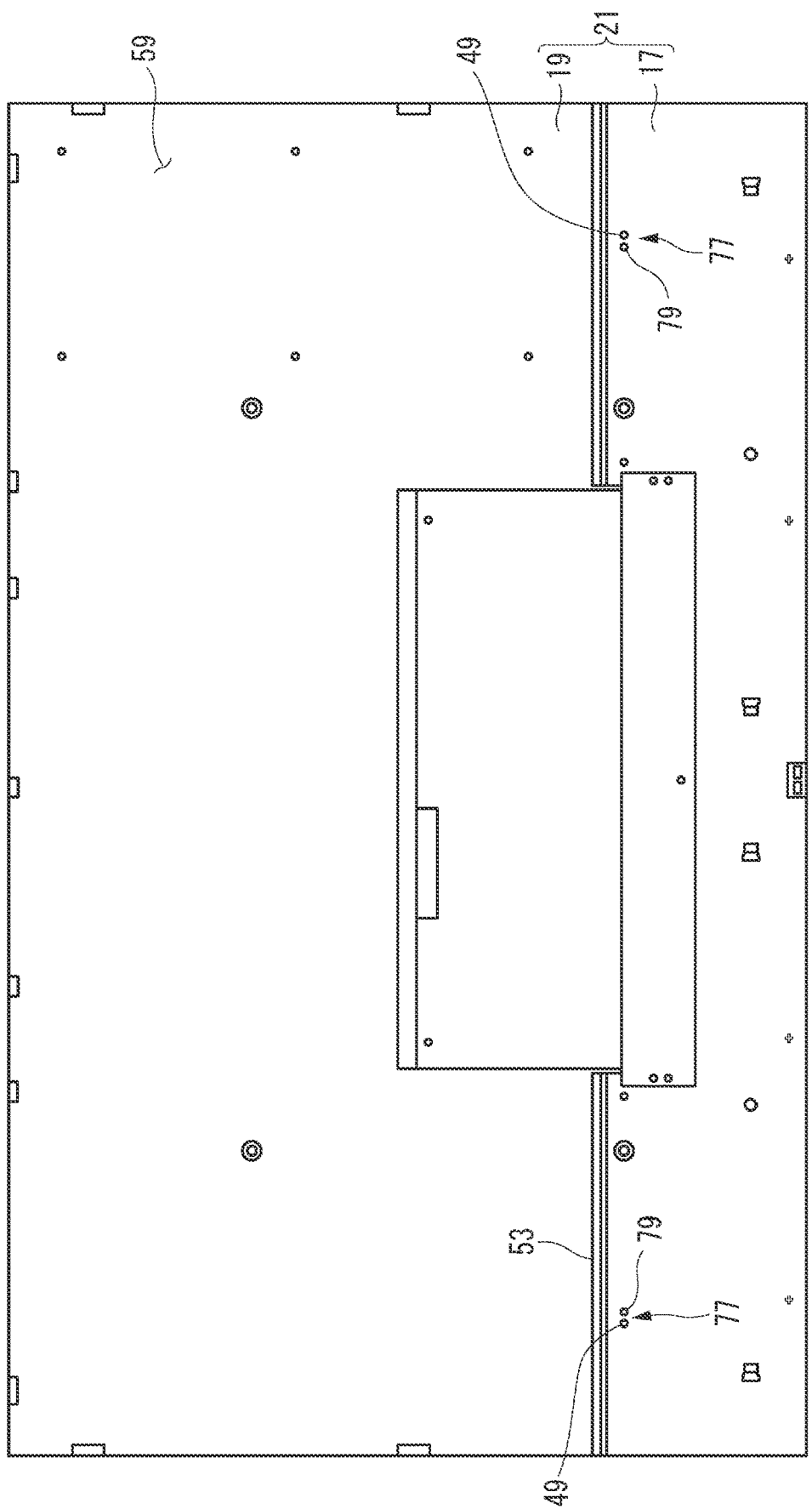
FIG. 4 is a rear view of the liquid crystal display device shown in FIG. 1.

FIG. 4 is a rear view of the liquid crystal display device 11 shown in FIG. 1. In the first embodiment, in the frame 21, the back-side frame 19 and the LED holding plate 17, which are separately formed, are integrally fixed by screws 49 that are fasteners. The back-side frame 19 is formed in a quadrangular shape substantially the same as that of the light-guiding plate 15. The LED holding plate 17 is formed in a long shape that extends along one end surface 33.

In the frame 21, the back-side frame 19 and the LED holding plate 17 may be integrally formed by a single metal plate.

Figure 5:
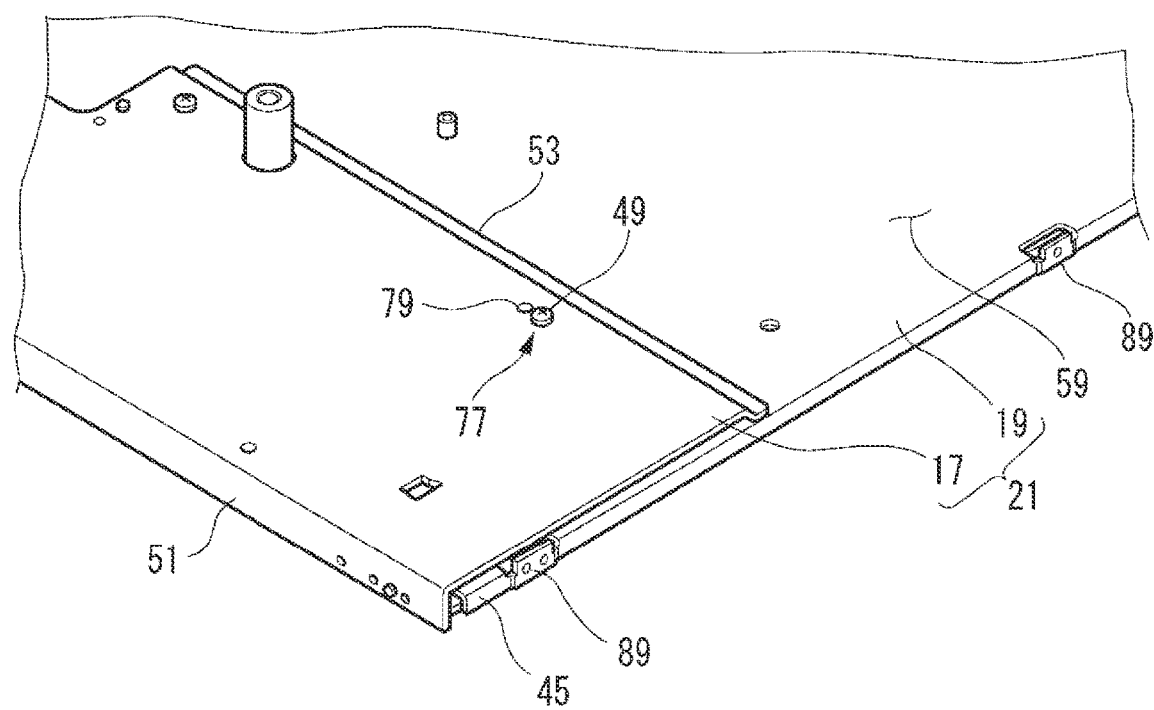
FIG. 5 is a perspective view of one end portion of an LED holding plate shown in FIG. 4 in an extending direction.

FIG. 5 is a perspective view of one end portion of the LED holding plate 17 shown in FIG. 4 in an extending direction. The LED holding plate 17 includes an LED fixing plate 51 that is an example of a light source fixing plate. The LED fixing plate 51 is bent perpendicularly to the back-side frame 19 and faces one end surface 33 of the light-guiding plate 15. In other words, the LED holding plate 17 and the LED fixing plate 51 are formed by bending one plate material perpendicularly to the back-side frame 19, so that a plate material portion parallel to the back-side frame 19 and a plate material portion perpendicular to the back-side frame 19 (that is, the LED fixing plate 51) are formed. A plurality of LEDs 25 that cause light to be incident on one end surface 33 of the light-guiding plate 15 are linearly arranged at equal intervals on the LED fixing plate 51 of the LED holding plate 17 (see FIG. 2).

Figure 6:
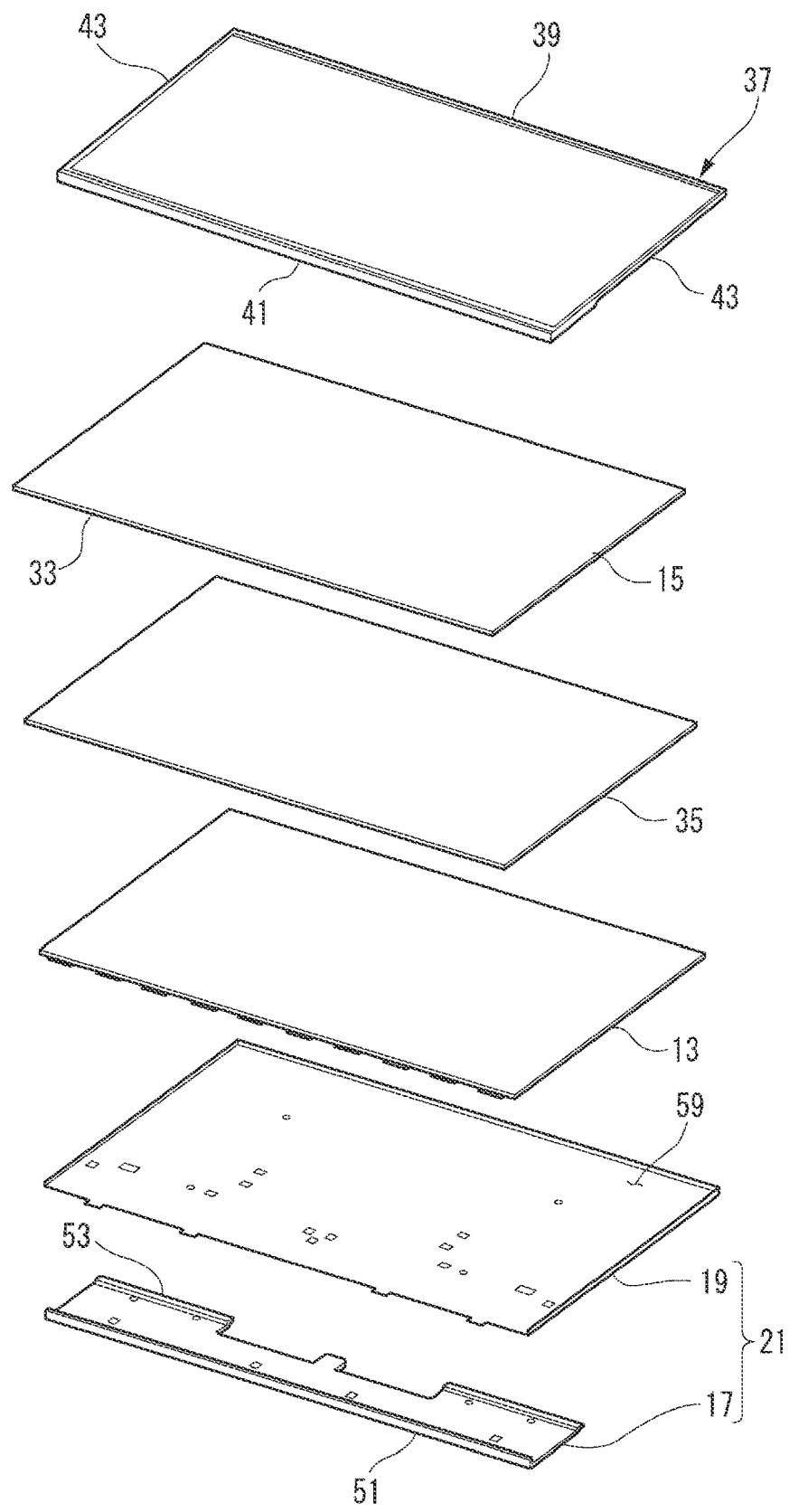
FIG. 6 is an exploded perspective view of members laminated between a light-guiding plate and the LED holding plate.

FIG. 6 is an exploded perspective view of members laminated between the light-guiding plate 15 and the LED holding plate 17. In the liquid crystal display device 11, the light-guiding plate 15 is closely fixed via the adhesive layer 35 to the display surface 31 of the liquid crystal panel 13. In the liquid crystal display device 11, the back-side frame 19, the liquid crystal panel 13, the adhesive layer 35, and the light-guiding plate 15 are sequentially laminated from a lower layer side. Among them, the liquid crystal panel 13 and the light-guiding plate 15 are integrally assembled by the adhesive layer 35. The light-guiding plate 15 to which the liquid crystal panel 13 is integrally fixed is positioned on the back-side frame 19. The light-guiding plate 15 positioned on the back-side frame 19 is held by the frame member 37 and the frame 21 by screwing the frame member 37 to the back-side frame 19 and the LED holding plate 17.

In the first embodiment, the liquid crystal display device 11 is assembled such that the back-side frame 19 and the liquid crystal panel 13 are not fixed.

In the liquid crystal display device 11, the LED holding plate 17 is formed of a metal plate that is thicker than a plate thickness of the back-side frame 19.

In the liquid crystal display device 11, a Z-bent portion 53 (see FIG. 2) is formed on a side opposite to the LED fixing plate 51 of the LED holding plate 17. The LED holding plate 17 has a component housing space 55 formed between the back-side frame 19 and the LED holding plate 17 by abutting a tip end of the Z-bent portion 53 against the back-side frame 19 (see FIG. 2).

Figure 7:
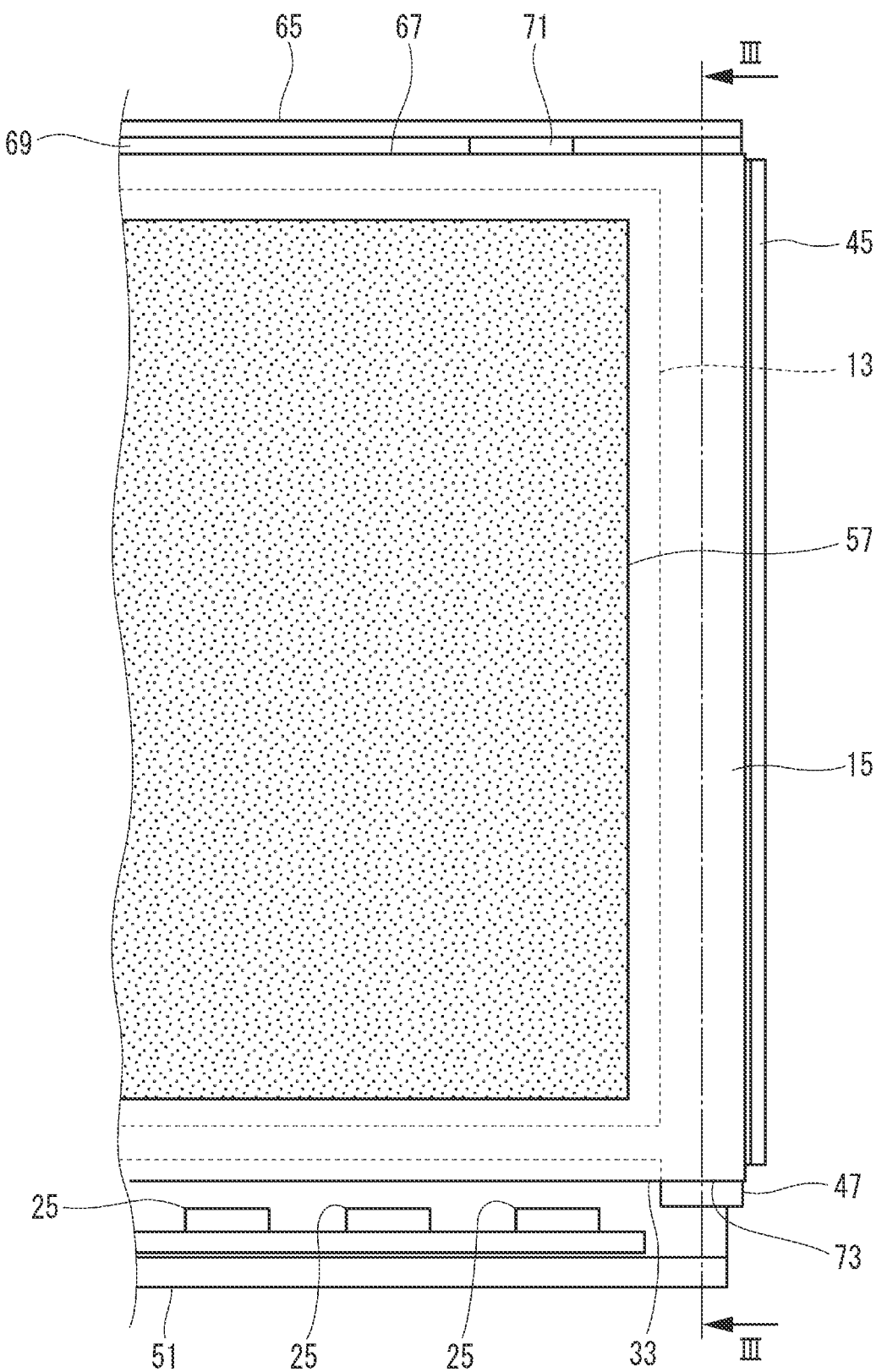
FIG. 7 is a front view of a right side of the liquid crystal display device in which a frame member is omitted.

FIG. 7 is a front view of a right side of the liquid crystal display device 11 in which the frame member 37 is omitted. A cross section taken along a line III-III in FIG. 7 is shown in FIG. 2. In the liquid crystal display device 11, a pair of positioning bent portions 47 are provided outside a display area 57 of the display surface 31.

Figure 8:
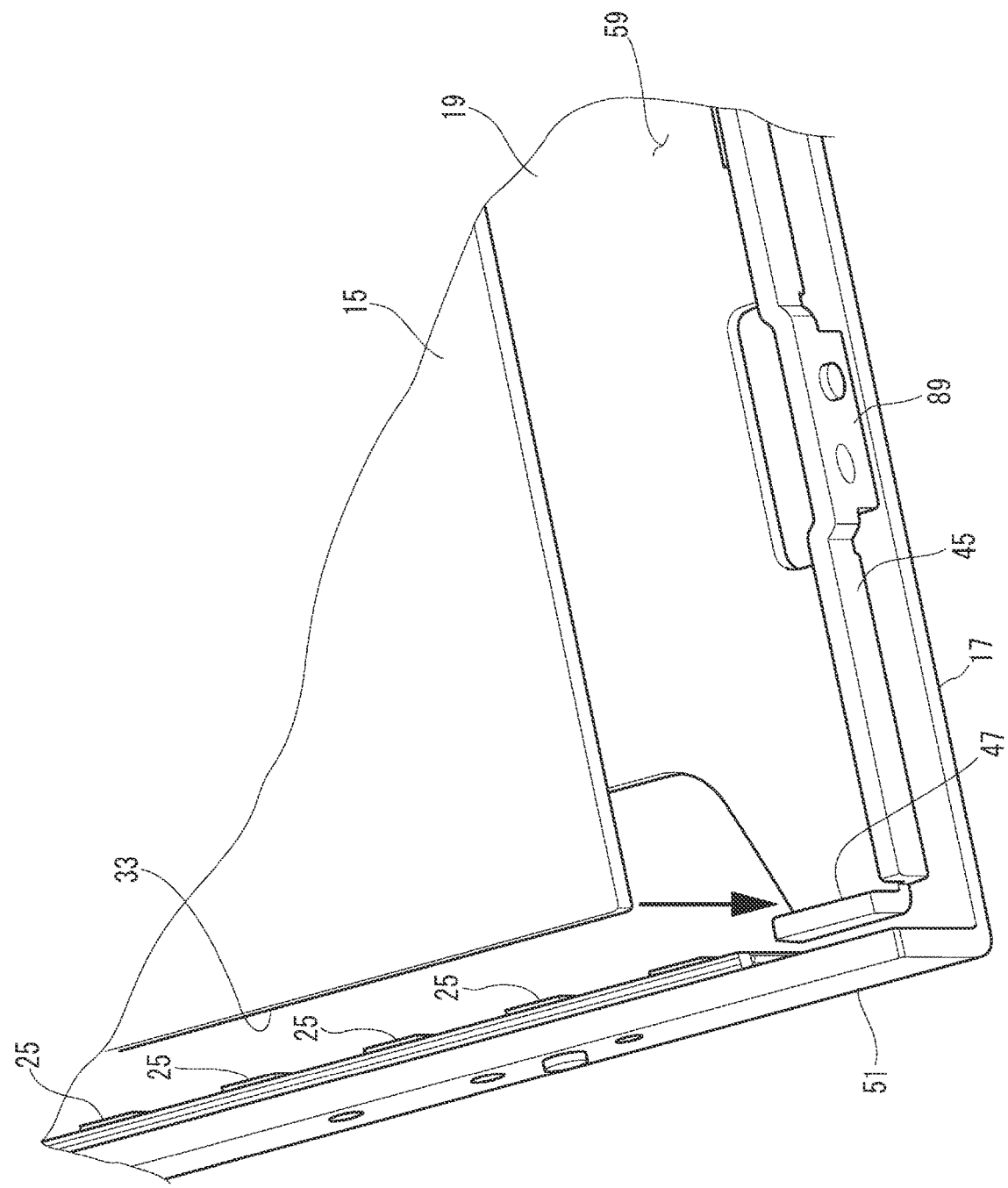
FIG. 8 is an exploded perspective view of a support structure of the light-guiding plate and a positioning bent portion.

FIG. 8 is an exploded perspective view of a support structure of the light-guiding plate 15 and a positioning bent portion 47. The back-side frame 19 includes a back-side portion 59. The back-side portion 59 is formed in a quadrangular shape substantially the same as that of the light-guiding plate 15, and is disposed in parallel with a back surface of the liquid crystal panel 13. The back-side portion 59 is supported by the LED holding plate 17. The pair of positioning bent portions 47, which are bent perpendicularly from the back-side portion 59 and support one end surface 33, are formed on both sides of a lower end edge 61, which is along one end surface 33 of the back-side portion 59 (see FIG. 12), with the light source (LEDs 25) sandwiched between the two sides.

The light-guiding plate 15 integrated with the liquid crystal panel 13 is supported on both sides of one end surface 33 of the light-guiding plate 15 in an extending direction of the one end surface 33 by the positioning bent portions 47 of the back-side frame 19. With this support structure, the light-guiding plate 15 is positioned with respect to the back-side frame 19 in a direction of approaching or being away from the LEDs 25. The liquid crystal panel 13 adhered to and integrated with the light-guiding plate 15 is also similarly positioned with respect to the back-side frame 19 via the light-guiding plate 15.

While the light-guiding plate 15 is assembled, one end surface 33 is abutted against the positioning bent portions 47 of the back-side frame 19 (that is, being abutted by an own weight) so as to serve as a positioning reference. A left end on a side of the back-side frame 19 opposite to the right end shown in FIG. 8 also has the same shape, and similarly, one end surface 33 is abutted the positioning bent portions 47 of the back-side frame 19 so as to serve as a positioning reference.

The member that forms the positioning bent portions 47 is not limited to the back-side frame 19. A positioning bent portion 47 may be formed in an inverted L-shape from a tip end edge 63 of the LED fixing plate 51 of the LED holding plate 17. Also in this case, the pair of positioning bent portions 47 are formed on both sides that sandwich the LEDs 25.

Figure 9:
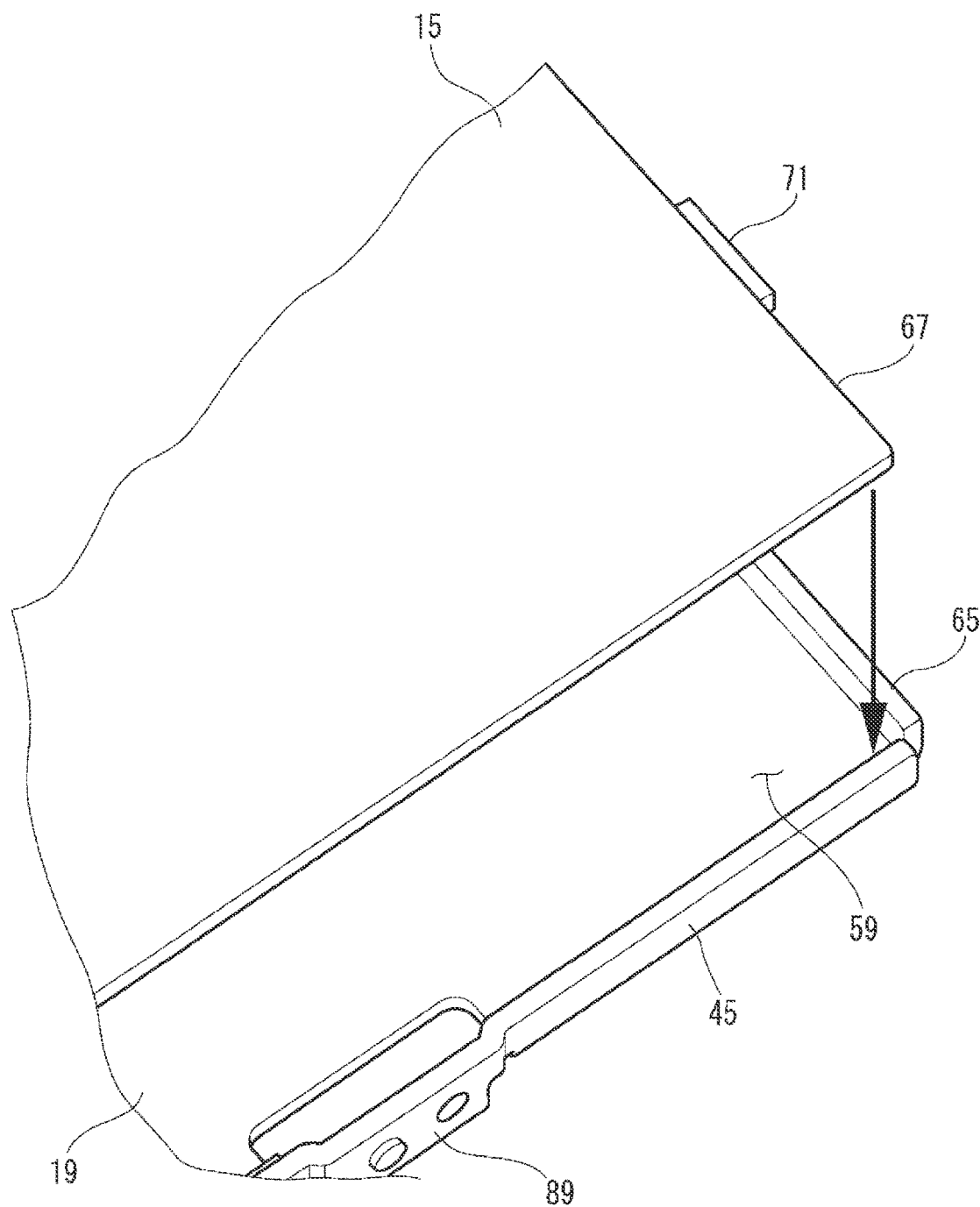
FIG. 9 is an exploded perspective view of a holding structure of the light-guiding plate and a holding bent portion.

FIG. 9 is an exploded perspective view of a holding structure of the light-guiding plate 15 and a holding bent portion 65. In the back-side frame 19, a holding bent portion 65 is formed, which is bent perpendicularly from the back-side portion 59 and faces the other end surface 67 of the light-guiding plate 15 parallel to one end surface 33 with a gap 69 formed between the holding bent portion 65 and the other end surface 67, on an upper-end edge of the back-side portion 59.

Figure 10:
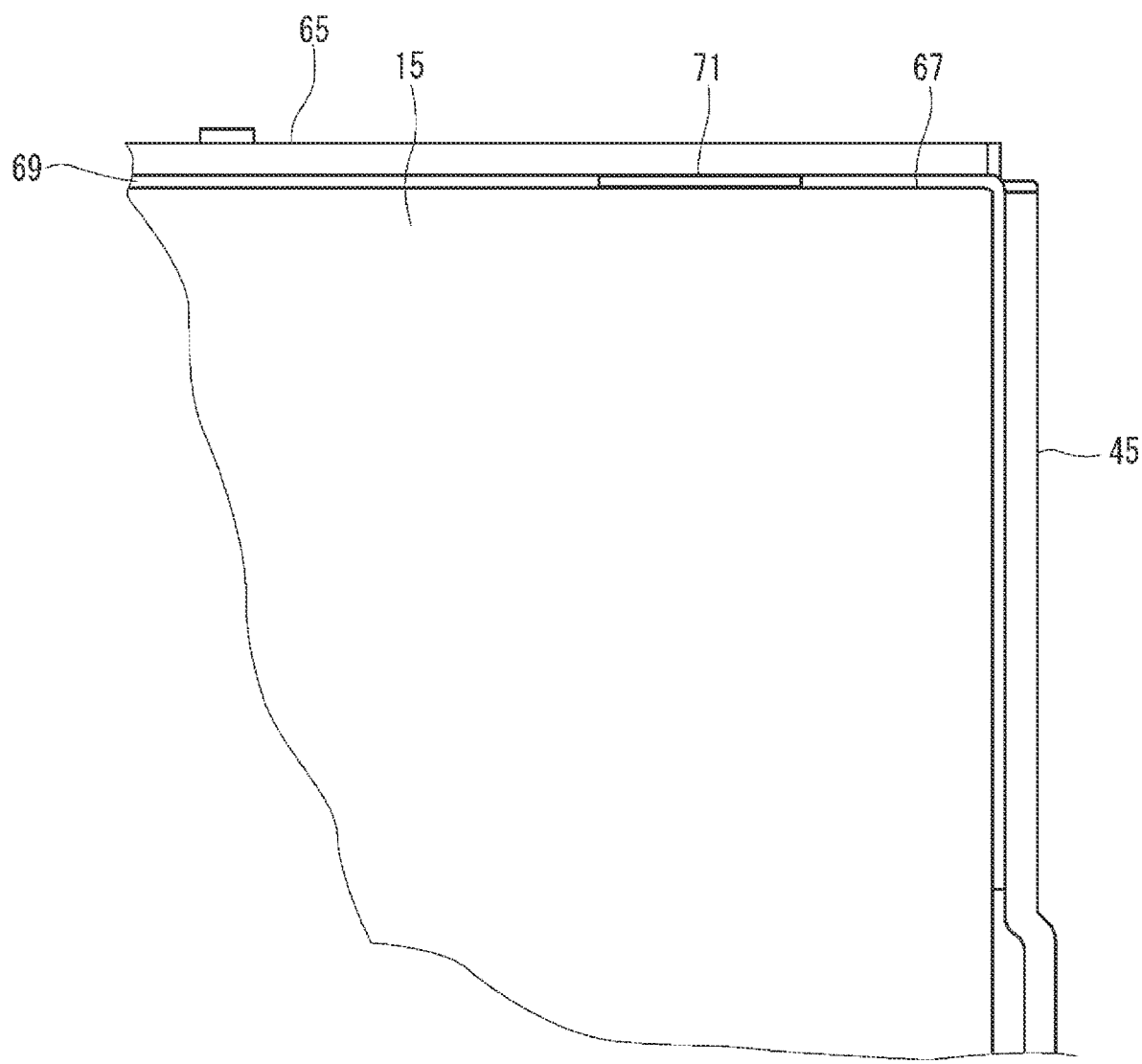
FIG. 10 is a front view of the holding structure of the light-guiding plate and the holding bent portion.

FIG. 10 is a front view of a holding structure of the light-guiding plate 15 and the holding bent portion 65. In the gap 69 between the holding bent portion 65 and the other end surface 67, an elastic body 71 pressed and compressed by the other end surface 67 of the light-guiding plate 15 is disposed.

In the liquid crystal display device 11, the pair of bent side plate portions 45 of the back-side portion 59, the LED fixing plate 51, and the holding bent portion 65 are continuously bent and formed over an entire length in a longitudinal direction along each side of the light-guiding plate 15.

Figure 11:
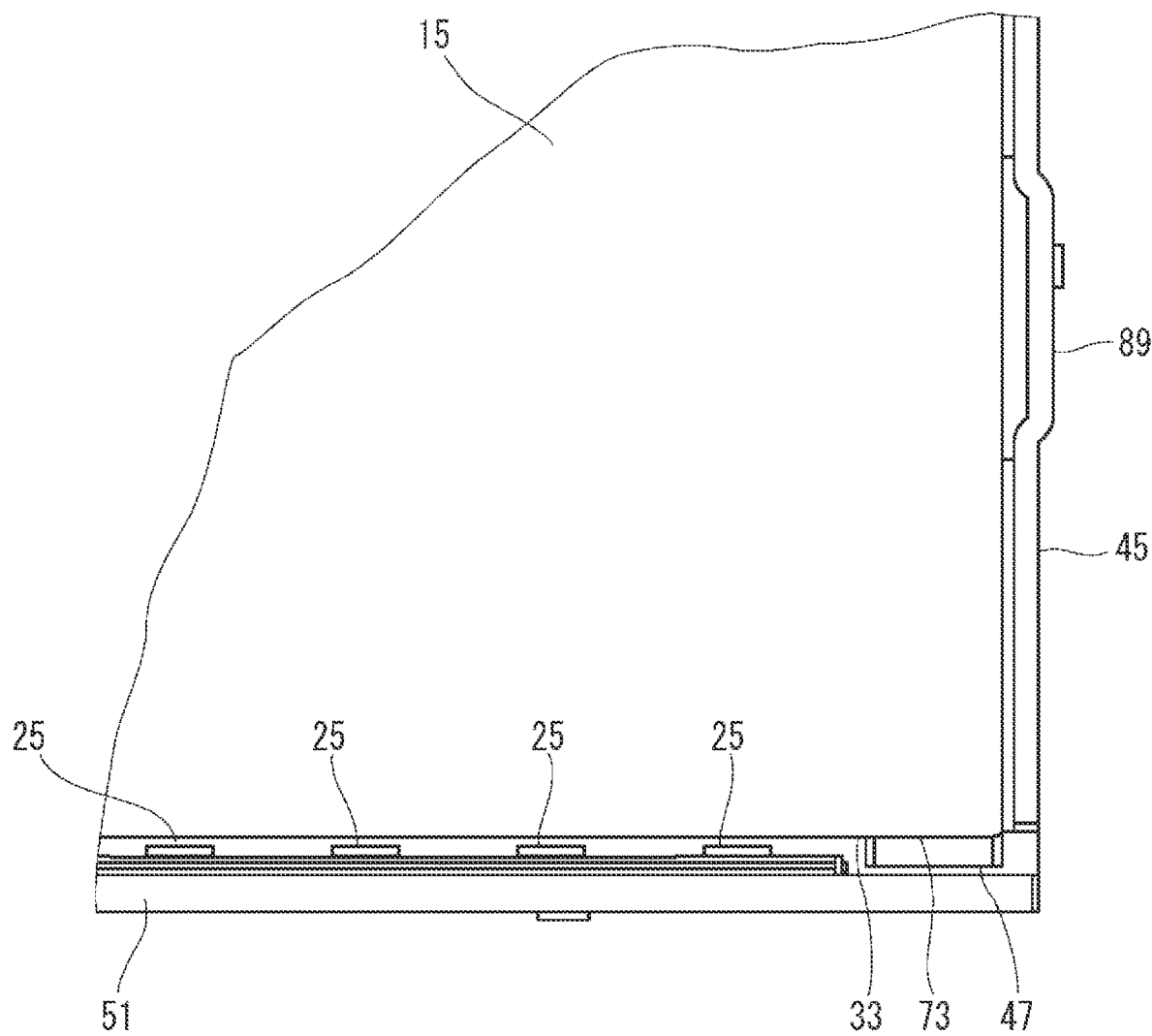
FIG. 11 is a front view of the support structure of the light-guiding plate and the positioning bent portion.

FIG. 11 is a front view of a support structure of the light-guiding plate 15 and a positioning bent portion 47. In the liquid crystal display device 11, a resin sheet 73 that is sufficiently thinner than the elastic body 71 is preferably sandwiched between the positioning bent portion 47 and one end surface 33.

Figure 12:
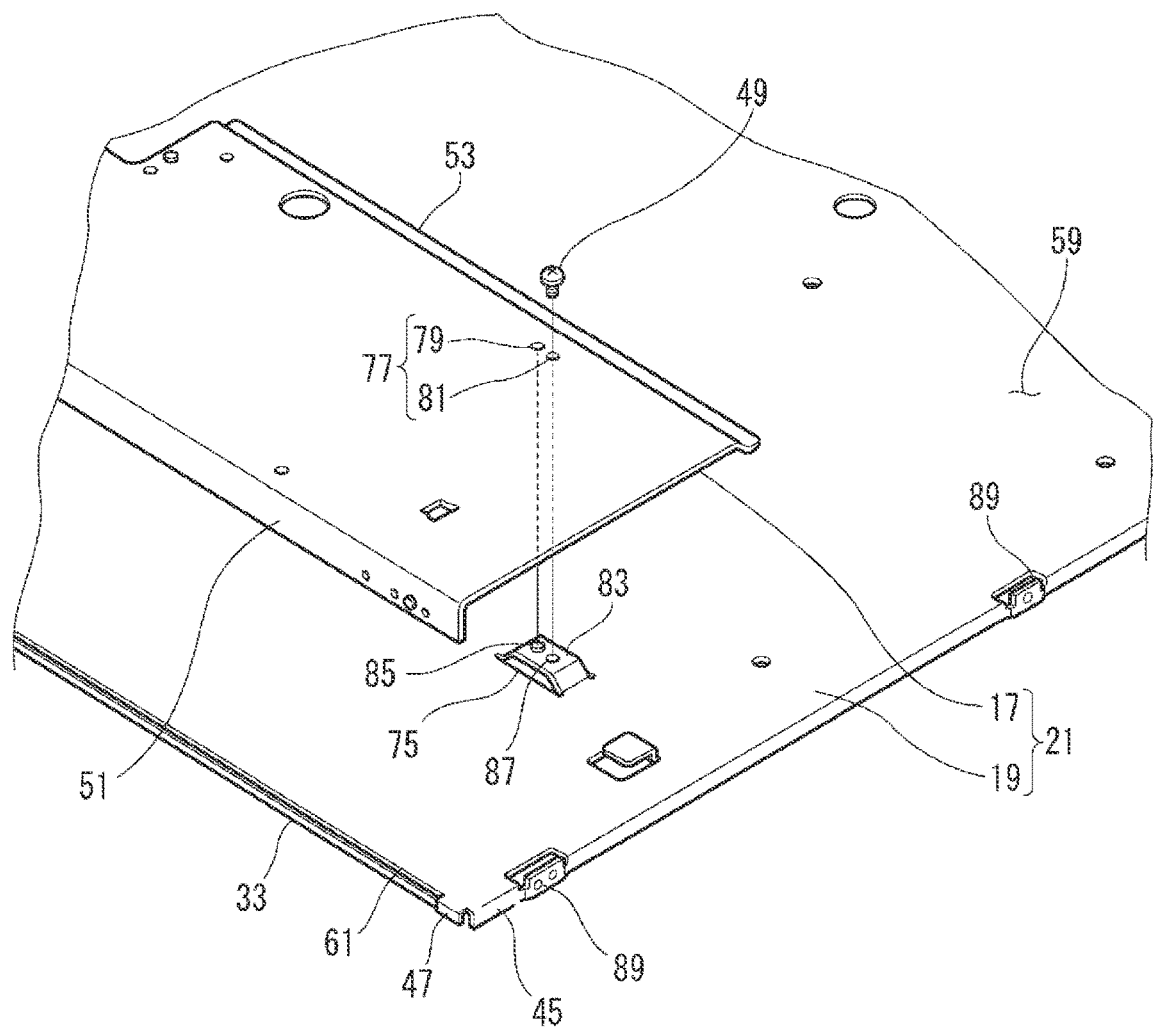
FIG. 12 is an exploded perspective view of a positioning portion between a bulging portion and the LED holding plate.

FIG. 12 is an exploded perspective view of a positioning portion 77 between a bulging portion 75 and the LED holding plate 17. A pair of positioning portions 77 each including a positioning hole 79 and a fastener insertion hole 81 are formed in the LED holding plate 17. The pair of positioning portions 77 are provided separately in a direction along one end surface 33.

On the other hand, a pair of bulging portions 75 that protrude toward the LED holding plate 17 are formed on the back-side frame 19. The bulging portions 75 are also provided separately in the direction along one end surface 33. A bulging portion 75 includes a boss 85 fitted into a positioning hole 79 of the back-side frame 19 and a female screw portion 87 with which a screw 49 is screwed, on a tip end seating surface 83 that is a flat surface.

A frame-member-fixing bulging portion 89 for fixing the frame member 37 is formed on a bent side plate portion 45 and the holding bent portion 65.

Next, an operation of the liquid crystal display device 11 according to the first embodiment will be described.

The liquid crystal display device 11 according to the first embodiment includes the quadrangular liquid crystal panel 13 including the reflection layer 27 on the back surface opposite to the display surface 31 with the liquid crystal enclosed between the glass panels, the light-guiding plate 15 that is formed in a quadrangular shape having a larger outer shape than that of the liquid crystal panel 13, is closely fixed via the adhesive layer 35 to the display surface 31 of the liquid crystal panel 13, and diffusely reflects light incident from one end surface 33 and emits the light toward the display surface 31, the light-guiding plate 15 being made of glass, the LED holding plate 17 in which the light source that causes light to be incident on said one end surface 33 is mounted on the LED fixing plate 51 disposed to face said one end surface 33, and the back-side frame 19 that includes the back-side portion 59 formed in a quadrangular shape substantially the same as that of the light-guiding plate 15, disposed in parallel with the back surface of the liquid crystal panel 13, and supported by the LED holding plate 17, and in which the pair of positioning bent portions 47 that are bent perpendicularly from the back-side portion 59 and support said one end surface 33 are formed on both sides that sandwich the light source therebetween at the lower end edge 61 along said one end surface 33 of the back-side portion 59.

In the liquid crystal display device 11, the light-guiding plate 15 is made of glass. In the light-guiding plate 15 made of glass, both ends of one end surface 33 are supported by the positioning bent portions 47. The positioning bent portions 47 are provided close to the LED fixing plate 51 at the lower end edge 61 of the back-side portion 59 of the back-side frame 19.

Figure 13:
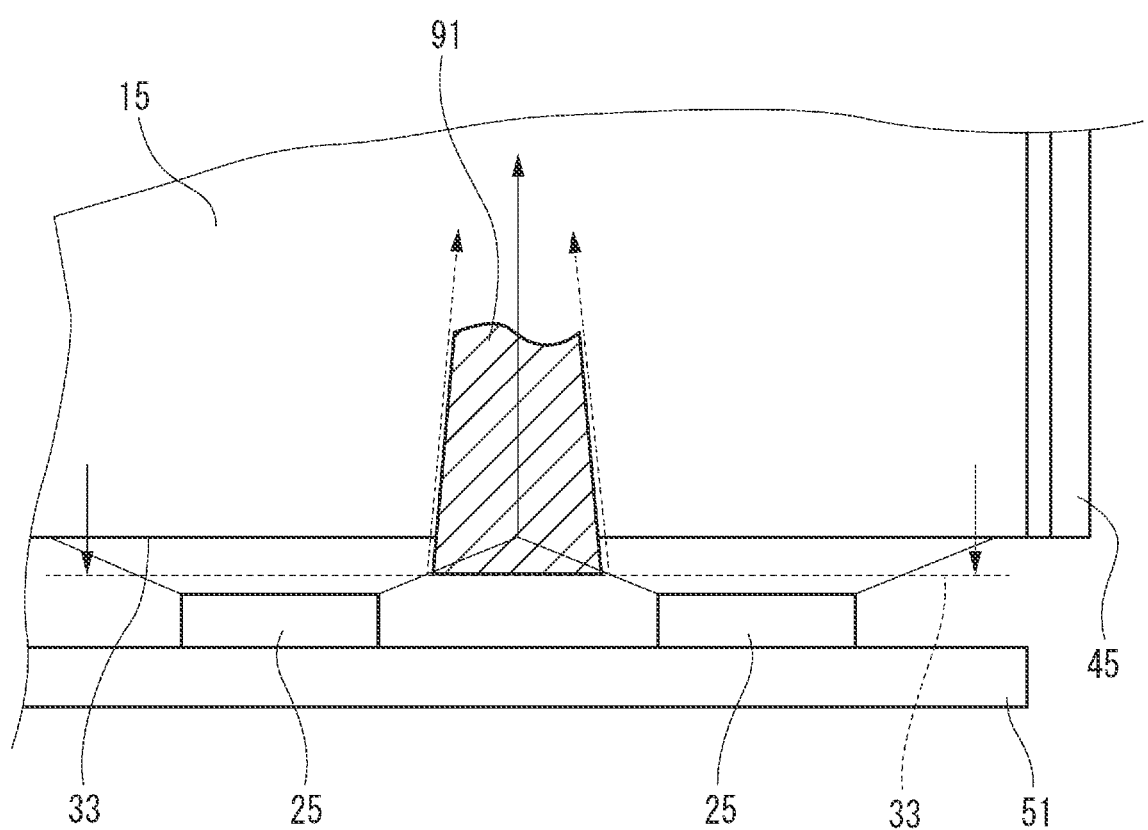
FIG. 13 is an operation illustrative view when one end surface is close to LEDs.

FIG. 13 is an operation illustrative view when one end surface 33 is close to the LEDs 25. When one end surface 33 of the light-guiding plate 15 is close to the LEDs 25, a light non-incident region 91 where light from the LEDs 25 is not incident is generated. In this case, the light-guiding plate 15 is likely to cause unevenness in color and brightness on a surface facing liquid crystal panel that emits light toward the liquid crystal panel 13.

On the contrary, in the liquid crystal display device 11, when the light-guiding plate 15 is thermally expanded by driving the LEDs 25 or the like, since one end surface 33 is supported by the positioning bent portions 47, the other end surface 67 extends (is displaced) in a direction away from the LEDs 25 with one end surface 33 as a reference. That is, a position of one end surface 33 with respect to the LEDs 25 is not displaced. Accordingly, in the light-guiding plate 15, a light incidence position is always constant, and color unevenness due to displacement of the light incidence position is prevented.

In the light-guiding plate 15, one end surface 33 is placed on the positioning bent portions 47 so as to support an entire weight. Therefore, it is not necessary to form a convex portion or a concave portion for positioning on a side portion, and it is possible to form a simple quadrangular shape in which four sides are straight lines. Accordingly, in the liquid crystal display device 11, the light-guiding plate 15 made of glass can be easily manufactured at a low cost.

In the liquid crystal display device 11, the light-guiding plate 15 for the front light is attached via the adhesive layer 35 to the display surface 31 of the liquid crystal panel 13. Here, if the light-guiding plate 15 is a resin panel, there is a difference in a linear expansion coefficient between the light-guiding plate 15 and the liquid crystal panel 13. In this case, when the light-guiding plate 15 and the liquid crystal panel 13 that are integrally fixed are thermally expanded, a stress in a surface direction is applied to the liquid crystal panel 13. As a result, the display surface 31 is easily curved and deformed into a concave curved surface or a convex curved surface. On the contrary, in the liquid crystal display device 11, since the light-guiding plate 15 is made of glass, the light-guiding plate 15 and the liquid crystal panel 13 have the same linear expansion coefficient. As a result, even when the light-guiding plate 15 is thermally expanded due to driving for a long time or the like, curved deformation of the concave curved surface or the convex curved surface generated on the display surface 31 can be prevented. Accordingly, the liquid crystal display device 11 can continue maintaining high image quality even under continuous use for a long time.

In the liquid crystal display device 11, the light-guiding plate 15 is made of glass, so that light transmittance can be increased as compared with the resin panel. Further, the light-guiding plate 15 made of glass can also improve weather resistance when used outdoors. Furthermore, the light-guiding plate 15 made of glass can be made thinner than that of the resin panel (thinning is achieved). The liquid crystal display device 11 also easily obtains high image quality because of these advantages over the resin panel.

Therefore, in the liquid crystal display device 11 according to the first embodiment, edge narrowing can be achieved with a simple structure, occurrence of positional deviation between the light source and the light-guiding plate 15 for the front light can be prevented, and deterioration of image quality due to a temperature change can be less likely to occur.

On the upper-end edge of the back-side portion 59, the holding bent portion 65 is formed which is bent perpendicularly from the back-side portion 59 and faces the other end surface 67 of the light-guiding plate 15 parallel to one end surface 33 with the gap 69 formed between the other end surface 67 and the holding bent portion 65. The elastic body 71 pressed and compressed by the other end surface 67 is disposed in the gap 69.

In the liquid crystal display device 11, in the light-guiding plate 15 whose one end surface 33 is supported by the positioning bent portions 47, the other end surface 67 on an upper side is pressed by the holding bent portion 65 via the elastic body 71. More specifically, in the other end surface 67, after the elastic body 71 is elastically deformed and inserted into the gap 69, one end surface 33 is placed on the positioning bent portions 47. The elastically deformed elastic body 71 is elastically restored. One end surface 33 of the light-guiding plate 15 is pressed against the positioning bent portions 47 by a restoring force at that time. Accordingly, the light-guiding plate 15 can be accurately positioned with reference to one end surface 33.

When the light-guiding plate 15 is assembled to the back-side frame 19, the elastic body 71 is elastically deformed and the other end surface 67 is inserted into the gap 69, so that one end surface 33 can bypass the positioning bent portions 47. In the light-guiding plate 15, when the positioning bent portions 47 are bypassed, one end surface 33 is then pressed against the positioning bent portions 47 by a restoring force of the elastic body 71. Accordingly, the light-guiding plate 15 can be easily set on the back-side frame 19.

In the liquid crystal display device 11, when the light-guiding plate 15 extends due to thermal expansion, and even when an impact is applied due to transportation or the like, the elastic body 71 is deformed and displacement is absorbed. Accordingly, the liquid crystal display device 11 can continue stably supporting the light-guiding plate 15 and the liquid crystal panel 13.

The pair of positioning bent portions 47 are provided outside the display area 57 of the display surface 31.

In the liquid crystal display device 11, the positioning bent portions 47 that support one end surface 33 of the light-guiding plate 15 are arranged at a position outside the display area 57 of the liquid crystal panel 13. Light that is emitted from the light source and is incident on the display area 57 is not blocked by the positioning bent portions 47. Accordingly, the liquid crystal display device 11 can prevent a decrease in light utilization efficiency.

The resin sheet 73 that is sufficiently thinner than the elastic body 71 is sandwiched between the positioning bent portions 47 and one end surface 33.

In the liquid crystal display device 11, one end surface 33 of the light-guiding plate 15 is placed on the positioning bent portions 47 via the resin sheet 73. That is, one end surface 33 is not directly in contact with the positioning bent portions 47. The resin sheet 73 is sufficiently thinner than the elastic body 71 (for example, about 0.1 to 0.2 mm). Since the resin sheet 73 is sufficiently thin, positional deviation of one end surface 33 that causes image quality to deteriorate does not occur. The resin sheet 73 is interposed, so that the light-guiding plate 15 can avoid unevenness, burrs, and the like generated in the positioning bent portions 47 from directly being in contact with one end surface 33. Accordingly, the light-guiding plate 15 made of glass is prevented from cracking due to occurrence of stress concentration on one end surface 33.

In the liquid crystal display device 11, the pair of bent side plate portions 45 of the back-side portion 59, the LED fixing plate 51, and the holding bent portion 65 are continuously bent and formed over the entire length in the longitudinal direction along each side of the light-guiding plate 15.

In the liquid crystal display device 11, the pair of bent side plate portions 45 and the holding bent portion 65 are formed on the back-side portion 59 of the back-side frame 19. That is, on the back-side portion 59, three bent portions bent toward the light-guiding plate 15 are continuous in a U shape. In the back-side portion 59, there is no bent portion on the lower end edge 61 except the positioning bent portions 47. The lower end edge 61 of the back-side portion 59 is a cut end formed by press working between the pair of positioning bent portions 47. This open portion is closed by the LED fixing plate 51 of the LED holding plate 17 that supports the back-side frame 19. Therefore, all four sides of the light-guiding plate 15 are surrounded by the bent portions.

Outside of these four bent portions is further covered by the frame member 37 (so-called bezel). The frame member 37 also simultaneously covers an outer peripheral edge of the display area 57 of the light-guiding plate 15. Accordingly, the light-guiding plate 15 is doubly surrounded by the bent portions and the frame member 37 whose outer periphery of four sides is continuous, so that airtightness is secured. As a result, the liquid crystal display device 11 can prevent light leakage from inside and dust entering from outside. Further, since both the bent portions and the frame member 37 are thin, even when a double structure in which the bent portions and the frame member 37 are stacked in a plate thickness direction is adopted, an edge of the liquid crystal display device 11 is not enlarged.

Although the embodiment is described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that they also belong to the technical scope of the present disclosure. Components in the embodiment mentioned above may be combined optionally in the range without deviating from the spirit of the invention.

This application is a continuation of PCT application No. PCT/JP2019/012250, which was filed on Mar. 22, 2019 based on Japanese Patent Application (No. 2018-100794) filed on May 25, 2018, the contents of which are incorporated herein by reference.

The present disclosure is useful as a liquid crystal display device that achieves edge narrowing with a simple structure and prevents occurrence of positional deviation between a light source and a light-guiding plate.

What is claimed is:

1. A liquid crystal display device comprising:
   a quadrangular liquid crystal panel having a reflection layer on a back surface opposite to a display surface of the liquid crystal panel;
   a light-guiding plate formed in a quadrangular shape having an outer shape larger than that of the liquid crystal panel, being closely fixed via an adhesive layer to the display surface, and configured to diffusely reflect light incident from one end surface of the light-guiding plate and emit the light toward the display surface, the light-guiding plate being made of glass;
   a light source holding plate in which a light source that causes light to be incident on the one end surface is mounted on a light source fixing plate which is disposed so as to face the one end surface; and
   a back-side frame that includes a back-side portion formed in a quadrangular shape substantially the same as that of the light-guiding plate, disposed in parallel with the back surface of the liquid crystal panel, and supported by the light source holding plate,
   wherein a pair of positioning bent portions that are bent perpendicularly from the back-side portion and support the one end surface are formed on both sides that sandwich the light source therebetween at a lower end edge of the back-side portion along the one end surface, and
   wherein a thin resin sheet is sandwiched between the positioning bent portion and the one end surface.

2. A liquid crystal display device comprising:
   a quadrangular liquid crystal panel having a reflection layer on a back surface opposite to a display surface of the liquid crystal panel;
   a light-guiding plate formed in a quadrangular shape having an outer shape larger than that of the liquid crystal panel, being closely fixed via an adhesive layer to the display surface, and configured to diffusely reflect light incident from one end surface of the light-guiding plate and emit the light toward the display surface, the light-guiding plate being made of glass;
   a light source holding plate in which a light source that causes light to be incident on the one end surface is mounted on a light source fixing plate which is disposed so as to face the one end surface; and
a back-side frame that includes a back-side portion formed in a quadrangular shape substantially the same as that of the light-guiding plate, disposed in parallel with the back surface of the liquid crystal panel, and supported by the light source holding plate,
wherein a pair of positioning bent portions that are bent perpendicularly from the back-side portion and support the one end surface are formed on both sides that sandwich the light source therebetween at a lower end edge of the back-side portion along the one end surface,
wherein on an upper-end edge of the back-side portion, a holding bent portion is formed which is bent perpendicularly from the back-side portion and faces the other end surface of the light-guiding plate parallel to the one end surface with a gap formed between the other end surface and the holding bent portion,
wherein an elastic body pressed and compressed by the other end surface is disposed in the gap, and
wherein the pair of bent side plate portions of the back-side portion, the light source fixing plate, and the holding bent portion are integrally formed and are continuously bent and formed over an entire length in a longitudinal direction along each side of the light-guiding plate.

3. A liquid crystal display device comprising:
a quadrangular liquid crystal panel having a reflection layer on a back surface opposite to a display surface of the liquid crystal panel;
a light-guiding plate formed in a quadrangular shape having an outer shape larger than that of the liquid crystal panel, being closely fixed via an adhesive layer to the display surface, and configured to diffusely reflect light incident from one end surface of the light-guiding plate and emit the light toward the display surface, the light-guiding plate being made of glass;
a light source holding plate in which a light source that causes light to be incident on the one end surface is mounted on a light source fixing plate which is disposed so as to face the one end surface; and
a back-side frame that includes a back-side portion formed in a quadrangular shape substantially the same as that of the light-guiding plate, disposed in parallel with the back surface of the liquid crystal panel, and supported by the light source holding plate from aback surface opposite to a front surface facing the liquid crystal panel,
wherein a pair of positioning bent portions that are bent perpendicularly from the back-side portion and support the one end surface are formed on both sides that sandwich the light source therebetween at a lower end edge of the back-side portion along the one end surface.

* * * * *